UNITED STATES PATENT OFFICE.

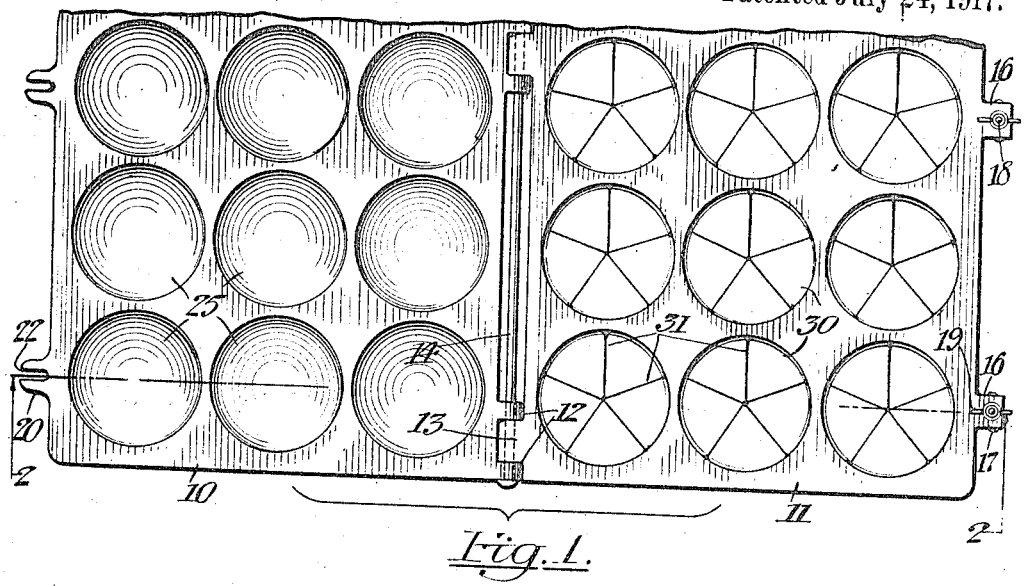

KOLOMAN STIGA, OF NEW YORK, N. Y.

MOLD FOR BAKING ROLLS.

1,234,407.      Specification of Letters Patent.      Patented July 24, 1917.

Application filed February 26, 1916. Serial No. 80,649.

*To all whom it may concern:*

Be it known that I, KOLOMAN STIGA, a subject of the King of Hungary, residing at New York, in the county of New York and State of New York, have invented new and useful Improvements in Molds for Baking Rolls, of which the following is a specification.

This invention relates to improvements in a device for baking with special reference to that type of bread known as rolls, in which the dough is formed into relatively thin circular shape, creased at the top prior to baking, such rolls at the present time being made by hand processes.

The principal object of the invention is to provide a form of pan or container in which the lumps of dough are placed and which will give to them the shape desired with greater accuracy and rapidity than can be attained by the processes commonly employed.

Another object is to provide such devices in forms which are readily handled both in the reception of the dough in the entrance and removal from the ovens, and in removing the baked rolls therefrom.

These and other similar objects are attained by the novel construction of parts hereafter described and shown in the accompanying drawing forming a material part of this specification, and in which:—

Figure 1 is a plan view showing the device extended in position to receive the dough.

Fig. 2 is a longitudinal sectional view, taken on line 2—2 of Fig. 1.

Fig. 3 is an enlarged fragmentary sectional view, showing one of the baking compartments and clamping means employed, and Fig. 4 is a perspective view showing the product obtained by the device.

The device consists principally of two substantially rectangular plates, numbered respectively 10 and 11 on the adjacent edges of which are formed hinge elements 12 and 13 near each end and connected by a rod 14 which passes from end to end of the plates, the same being held therein by upsetting or riveting the ends as indicated.

The interengaging lugs 12 and 13 are so arranged as to prevent longitudinal movement of the plates so that when close together, the several openings containing the rolls will be in register.

Upon the opposite outer edge of the element 11 are formed lugs 16 in which are pivoted by means of the pins 17 swinging screw bolts 18 provided with winged clamp nuts 19, while upon the corresponding outer edge of the plate 10 are lugs 20, having between them a bifurcated recess 22 receptive of the stem of the bolts 18.

These two plates may be closed together so that their adjacent faces are in intimate contact and clamped securely in such position by means of the nuts and bolts in an obvious manner.

Formed in the plate 10 are a plurality of concave depressions 25 substantially circular in outline and having curved interior walls adjoining the bottom which may be made preferably flat, as shown best in Fig. 3.

In the other plate 11 are corresponding cavities 30, in which are partial partitions 31, the same having an acutely formed edge curved on both sides to the general contour so that the completed product will be similar in appearance to that of the hand made article as indicated in Fig. 4.

It is to be noticed that the thickness of the walls of both plates are substantially uniform, so that the rolls may be heated uniformly in the process of baking, and that, whatever expansion or contraction may occur may be uniform throughout.

In operation, the dough is divided into lumps of uniform size and deposited into the cavities 25 whereupon the plates are close together, secured by the clamping means and the whole device is again ready for further operations.

Having thus described my invention, what I claim as new and desire to secure by Letters Patent is:—

1. In an apparatus for baking dough into solid rolls, the combination with a pair of coöperating plate sections and means for holding them in operative position, of a plurality of spaced-apart cavities formed in the inner face of one section, each cavity being substantially circular in outline and having curved interior walls prolonged into a flat bottom, and a corresponding plurality of spaced apart cavities formed in the confronting face of the other section, each cavity having acutely edged semi-partitions converging into a prolonged outstanding point at the center of the bottom of the cavity to give the top of the roll centrally converging divisional lines.

2. In an apparatus for baking dough into solid rolls, the combination with a pair of rectangular complementary plate sections hinged together at one end, of spaced apart cavities formed in the bottom member of said sections, each cavity being substantially circular in outline with curved interior walls prolonged into flat bottoms, coöperative cavities formed in the top member of said sections, each cavity having acutely edged semi-partitions converging into a prolonged outstanding point in the center thereof to give the top of the roll centrally converging divisional lines, means for causing said sections to register positively when brought into intimate contact, the walls of the complementary sections being all of substantially uniform thickness.

In testimony whereof I have signed my name to this specification.

KOLOMAN STIGA.